United States Patent
Li et al.

(10) Patent No.: US 12,277,169 B2
(45) Date of Patent: Apr. 15, 2025

(54) METHOD AND APPARATUS FOR TRAINING AN IMAGE-TEXT MUTUAL RETRIEVAL MODEL, IMAGE-TEXT MUTUAL RETRIEVAL METHOD, AND DEVICE

(71) Applicant: SUZHOU METABRAIN INTELLIGENT TECHNOLOGY CO., LTD., Jiangsu (CN)

(72) Inventors: Rengang Li, Jiangsu (CN); Li Wang, Jiangsu (CN); Zhenhua Guo, Jiangsu (CN); Baoyu Fan, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/724,836

(22) PCT Filed: Nov. 24, 2022

(86) PCT No.: PCT/CN2022/134092
§ 371 (c)(1),
(2) Date: Jun. 27, 2024

(87) PCT Pub. No.: WO2024/011815
PCT Pub. Date: Jan. 18, 2024

(65) Prior Publication Data
US 2024/0419725 A1    Dec. 19, 2024

(30) Foreign Application Priority Data
Jul. 15, 2022 (CN) .......................... 202210829134.9

(51) Int. Cl.
*G06F 16/583* (2019.01)
*G06F 16/353* (2025.01)
*G06F 40/30* (2020.01)

(52) U.S. Cl.
CPC ........ *G06F 16/5846* (2019.01); *G06F 16/353* (2019.01); *G06F 40/30* (2020.01)

(58) Field of Classification Search
None
See application file for complete search history.

(56) References Cited

U.S. PATENT DOCUMENTS

| 10,373,022 B1 | 8/2019 | Zhang et al. |
| 2019/0377979 A1* | 12/2019 | Jiang ...................... G06F 18/217 |

(Continued)

FOREIGN PATENT DOCUMENTS

| AU | 2021104218 A4 | 9/2021 |
| CN | 108647350 A | 10/2018 |

(Continued)

OTHER PUBLICATIONS

International Search Report issued in the corresponding PCT Application No. PCT/CN2022/134092, Mar. 11, 2023.

(Continued)

*Primary Examiner* — Leon Viet Q Nguyen
(74) *Attorney, Agent, or Firm* — Merchant & Gould P.C.

(57) ABSTRACT

Disclosed in the present disclosure are an image-text mutual retrieval model training method and apparatus, an image-text mutual retrieval method, and a device, applied to the technical field of retrieval. The image-text mutual retrieval model training method includes: acquiring training data pairs; inputting the training data pair in an initial model, and extracting text coding features of text training data and image coding features of image training data by using a text coding module and an image coding module in the initial model, respectively; calculating a training loss based on the text coding features and the image coding features, and performing parameter adjustment on the initial model based on the training loss; and in response to the training loss (Continued)

meeting a convergence condition, determining the initial model after the parameter adjustment as an image-text mutual retrieval model.

20 Claims, 8 Drawing Sheets

(56) References Cited

U.S. PATENT DOCUMENTS

| | | | |
|---|---|---|---|
| 2020/0027034 A1* | 1/2020 | Banerjee | G06N 20/00 |
| 2021/0271707 A1 | 9/2021 | Lin et al. | |
| 2022/0222920 A1 | 7/2022 | Huang et al. | |
| 2023/0351172 A1* | 11/2023 | Bar Eliyahu | G06F 40/216 |

FOREIGN PATENT DOCUMENTS

| | | |
|---|---|---|
| CN | 112529986 A | 3/2021 |
| CN | 113435529 A | 9/2021 |
| CN | 113836333 A | 12/2021 |
| CN | 114722224 A | 7/2022 |
| CN | 114896373 A | 8/2022 |

OTHER PUBLICATIONS

Office Action issued in the corresponding Chinese Patent Application No. 202210829134.9, Aug. 23, 2022.
Search Reports issued in the corresponding Chinese Patent Application No. 202210829134.9.
Notification to Grant Patent Right for Invention issued in the corresponding Chinese Patent Application No. 202210829134.9, Sep. 7, 2022.

* cited by examiner

METHOD AND APPARATUS FOR TRAINING AN IMAGE-TEXT MUTUAL RETRIEVAL MODEL, IMAGE-TEXT MUTUAL RETRIEVAL METHOD, AND DEVICE

CROSS-REFERENCE TO RELATED APPLICATION

The present application is a National Stage Filing of the PCT International Application No. PCT/CN2022/134092 filed Nov. 24, 2022, which claims priority to Chinese Patent Application No. 202210829134.9, filed to the China National Intellectual Property Administration on Jul. 15, 2022 and entitled "Image-Text Mutual Retrieval Model Training Method and Apparatus, Image-Text Mutual Retrieval Method, and Device", the disclosure of which is hereby incorporated by reference in its entirety.

TECHNICAL FIELD

The present disclosure relates to the technical field of retrieval, and in particular to an image-text mutual retrieval model training method and apparatus, an image-text mutual retrieval method, and a device.

BACKGROUND

With the advent of the information age, the data that needs to be retrieved is massive. In addition, in the massive data, there are often correlations between multimodal data, such as text data and image data. In some scenarios, there is also a need to retrieve the image data based on the text data, or to retrieve the text data based on the image data.

SUMMARY

In view of this, the purpose of the present disclosure is to provide method and apparatus for training an image-text mutual retrieval model, image-text mutual retrieval method, and device.

In a first aspect, the present disclosure discloses an image-text mutual retrieval model training method, including the following operations.

Training data pairs is acquired. The training data pairs include text training data and image training data, the text training data including long text data, the long text data is text data containing a plurality of target texts, and the target text is a sentence or a phrase.

The training data pairs are input into an initial model, and text coding features of the text training data are extracted by using a text coding module, and image coding features of the image training data are extracted by using an image coding module in the initial model, respectively. The text coding module includes multi-layer Long-Short Term Memory (LSTM) networks, the multi-layer LSTM networks including a first LSTM network layer and a second LSTM network layer, the first LSTM network layer being configured to acquire a feature of each target text based on a feature of each word in each target text, and the second LSTM network layer being configured to acquire a feature of the long text data based on the feature of each target text.

A training loss is calculated based on the text coding features and the image coding features, and parameter adjustment is performed on the initial model based on the training loss.

In response to the training loss meeting a convergence condition, an initial model after the parameter adjustment is determined as the image-text mutual retrieval model.

In one embodiment of this application, the first LSTM network layer includes a plurality of Bi-directional LSTM (BILSTM) networks, each BiLSTM network including a plurality of BILSTM units. Different BiLSTM units are configured to extract the features of different words, and different BILSTM networks output the features of different target texts.

The second LSTM network layer includes a plurality of BILSTM units, an input of the BiLSTM unit being a feature of the target text output by a corresponding BiLSTM network in the first LSTM network layer.

In one embodiment of this application, the text training data includes a plurality of pieces of long text data, and accordingly, the text coding module includes a plurality of multi-layer LSTM networks, each multi-layer LSTM network being configured to acquire a feature of one piece of long text data.

In one embodiment of this application, the text training data further includes short text data, the short text data being text data containing one target text. Accordingly, the text coding module further includes a short text feature extraction module, configured to extract a feature of the short text data.

In one embodiment of this application, the operation that the text coding features of the text training data is extracted by using the text coding module in the initial model includes the following operation.

The features of the plurality of pieces of long text data and the features of the short text data are concatenated to obtain the text coding features of the text training data.

In one embodiment of this application, the operation that the training data pairs are acquired includes the following operations.

Text data and image data in the same paper are extracted.

The text data is classified based on semantics to obtain text data of each type.

The text data of each type is determined as either the long text data or the short text data based on the number of target texts.

The text data of each type is determined as the text training data in the training data pairs, and the image data is determined as the image training data in the training data pairs.

In one embodiment of this application, the image training data is an image sequence. The image coding module includes a backbone and a BiLSTM network, and accordingly, the operation that the image coding features of the image training data is extracted by using the image coding module includes the following operations.

A feature of each image in the image sequence is extracted by using the backbone to obtain an image feature.

Each image feature is input in the BiLSTM network to obtain the image coding features.

In one embodiment of this application, the image coding module further includes an attention structure, and accordingly, the operation that each image feature is input in the BiLSTM network to obtain the image coding features includes the following operations.

Each image feature is input in the attention structure to obtain an attention weight of each image feature.

A final feature of each image feature is determined based on the attention weight, and the final feature is input in the BiLSTM network to obtain the image coding features.

In one embodiment of this application, the operation that the training loss is calculated based on the text coding features and the image coding features includes the following operations.

Positive samples and negative samples corresponding to anchor samples are determined for N coding feature pairs of N training data pairs in a batch. Each coding feature pair is a coding pair composed of the text coding feature and the image coding feature of the training data pair, each anchor sample is any text coding feature or image coding feature in the N coding feature pairs, the positive sample is the other coding feature paired with the anchor sample, and the negative sample is all the coding features except the other coding feature in the N coding feature pairs.

The training loss is calculated based on the anchor samples, and the positive samples and the negative samples corresponding to the anchor samples.

In one embodiment of this application, before the training data is input in the initial model, the method further includes the following operations.

It is determined whether to perform scrambling processing on target long text data based on a preset probability. The target long text data is long text data with a temporal relationship between sentences in the text training data.

In response to a determination to perform scrambling processing on the target long text data, scrambling processing is performed on the target long text data, otherwise scrambling processing is not performed on the target long text data.

A label is added to the target long text data, the label representing whether the target long text data has subjected to scrambling processing.

In one embodiment of this application, the method further includes the following operation.

A temporal constraint loss is calculated based on a feature of the target long text data and the label of the target long text data.

In one embodiment of this application, the operation that the training loss is calculated based on the anchor samples, and the positive samples and the negative samples corresponding to the anchor samples includes the following operations.

A target triplet loss is calculated based on the anchor samples, and the positive samples and the negative samples corresponding to the anchor samples.

The training loss is calculated by using the target triplet loss and the temporal constraint loss.

In a second aspect, the present disclosure discloses an image-text mutual retrieval method, including the following operations.

Target data is acquired. The target data is image data or text data.

The target data is input in an image-text mutual retrieval model, so that the image-text mutual retrieval model extracts a target coding feature of the target data. The image-text mutual retrieval model is obtained based on the aforementioned method for training the image-text mutual retrieval model.

All data coding features of a data set to be retrieved are matched to obtain a retrieval result.

In respond to the target data being the image data, all the data coding features are text coding features, and in response to the target data being the text data, all the data coding features are image coding features.

In a third aspect, the present disclosure discloses an image-text mutual retrieval model training apparatus, including a training data acquisition module, a feature extraction module, a loss calculation module, a parameter adjustment module, and an image-text mutual retrieval model determination module.

The training data acquisition module is configured to acquire training data pairs. The training data pairs include text training data and image training data, the text training data including long text data, the long text data being text data containing a plurality of target texts, and the target text being a sentence or a phrase.

The feature extraction module is configured to input the training data pairs in an initial model, and extract text coding features of the text training data and image coding features of the image training data by using a text coding module and an image coding module in the initial model, respectively. The text coding module includes multi-layer LSTM networks, the multi-layer LSTM network including a first LSTM network layer and a second LSTM network layer, the first LSTM network layer being configured to acquire a feature of each target text based on a feature of each word in each target text, and the second LSTM network layer being configured to acquire a feature of the long text data based on the feature of each target text.

The loss calculation module is configured to calculate a training loss based on the text coding features and the image coding features.

The parameter adjustment module is configured to perform parameter adjustment on the initial model based on the training loss.

The image-text mutual retrieval model determination module is configured to determine, in response to the training loss meeting a convergence condition, the initial model after the parameter adjustment as an image-text mutual retrieval model.

In a fourth aspect, the present disclosure discloses an electronic device, including a memory and a processor.

The memory is configured to store computer programs.

The processor is configured to execute the computer programs to implement the aforementioned method for training the image-text mutual retrieval model, and/or, the aforementioned image-text mutual retrieval method.

In a fifth aspect, the present disclosure discloses a non-volatile readable storage medium, configured to store computer programs. in response to a execution by a processor, the computer programs implement the aforementioned method for training the image-text mutual retrieval model, and/or, the aforementioned image-text mutual retrieval method.

It can be seen that, in the present disclosure, the training data pairs are acquired; the training data pairs include the text training data and the image training data, the text training data including the long text data, the long text data being the text data containing the plurality of target texts, and the target text being the sentence or the phrase; and then the training data pairs are input in the initial model, and the text coding features of the text training data and the image coding features of the image training data are extracted by using the text coding module and the image coding module in the initial model, respectively; the text coding module includes the multi-layer LSTM network, the multi-layer LSTM network including the first LSTM network layer and the second LSTM network layer, the first LSTM network layer being configured to acquire the feature of each target text based on the feature of each word in each target text, and the second LSTM network layer being configured to acquire the feature of the long text data based on the feature of each target text; then the training loss is calculated based on the text coding features and the image coding features, and parameter adjustment is performed on the initial model based on the training loss; and if the training loss meets the convergence condition, the initial model after the parameter adjustment is determined as the image-text mutual retrieval model. That is, in the present disclosure, the features of the text training data are extracted by using the multi-layer LSTM network, the feature of each sentence or phrase is acquired by using the first LSTM network based on the feature of each word in each target text, and then the feature of the long text data is acquired by using the second LSTM network layer based on the feature of each sentence or phrase.

BRIEF DESCRIPTION OF THE DRAWINGS

In order to more clearly illustrate the embodiments of the present disclosure or the technical solutions in the related art, the drawings used in the description of the embodiments or the related art will be briefly described below. It is apparent that the drawings described below are only some embodiments of the present disclosure. Other drawings may further be obtained by those of ordinary skill in the art according to these drawings without creative efforts.

DETAILED DESCRIPTION OF THE EMBODIMENTS

The technical solutions in embodiments of the present disclosure will be clearly and completely described below in conjunction with the drawings in the embodiments of the present disclosure. It is apparent that the described embodiments are only part of the embodiments of the present disclosure but not all of the embodiments. All other embodiments obtained by those of ordinary skill in the art on the basis of the embodiments in the present disclosure without creative work shall fall within the scope of protection of the present disclosure.

With the advent of the information age, the data that needs to be retrieved is massive. In addition, in the massive data, there are often correlations between multimodal data, such as text data and image data. In some scenarios, there is also a need to retrieve the image data based on the text data, or to retrieve the text data based on the image data. Therefore, how to accurately perform image-text mutual retrieval is a problem that needs to be solved at present. To this end, the present disclosure provides an image-text mutual retrieval model training and image-text mutual retrieval solution, which can improve the performance of an image-text mutual retrieval model, thereby improving the accuracy of image-text mutual retrieval.

Figure 1:
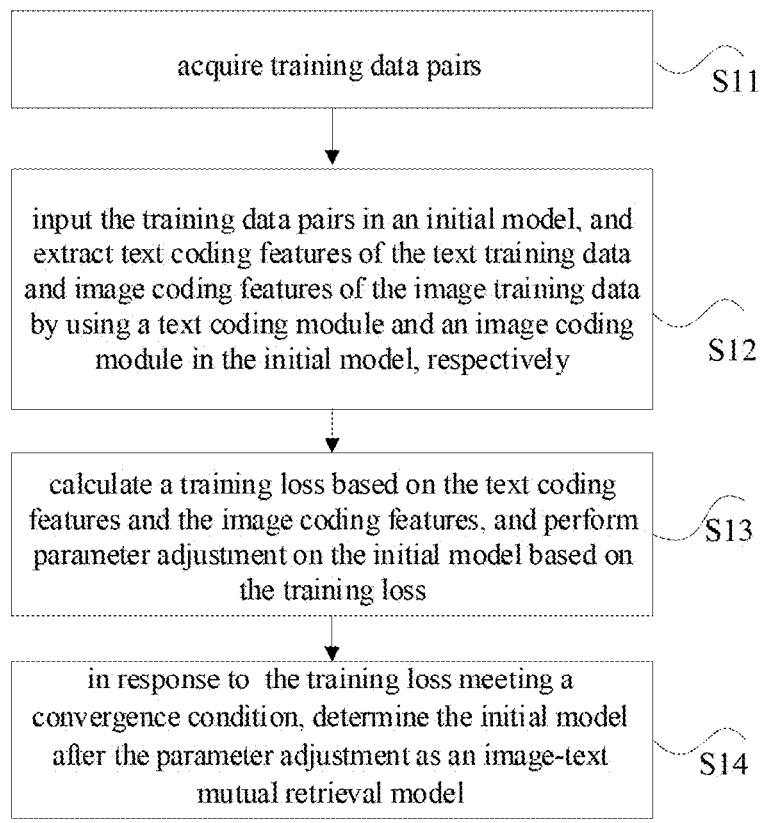
FIG. 1 is a flowchart of an image-text mutual retrieval model training method disclosed in the present disclosure.

Referring to FIG. 1, an image-text mutual retrieval model training method includes the following operations.

At S11, training data pairs are acquired. The training data pairs includes text training data and image training data, the text training data including long text data, the long text data being text data containing a plurality of target texts, and the target text being a sentence or a phrase.

At S12, the training data pairs are input in an initial model, and text coding features of the text training data and image coding features of the image training data are extracted by using a text coding module and an image coding module in the initial model, respectively. The text coding module includes multi-layer LSTM networks, the multi-layer LSTM network including first LSTM network layers and second LSTM network layers, the first LSTM network layer being configured to acquire a feature of each target text based on a feature of each word in each target text, and the second LSTM network layer being configured to acquire a feature of the long text data based on the feature of each target text.

In some implementations, the first LSTM network layer includes a plurality of BILSTM networks, each BiLSTM network including a plurality of BILSTM units. Different BILSTM units are configured to extract the features of different words, and different BILSTM networks output the features of different target texts. The second LSTM network layer includes a plurality of BILSTM units, an input of the BiLSTM unit being a feature of the target text output by a corresponding BiLSTM network in the first LSTM network layer.

In addition, the text coding module further includes word coding layers, configured to code each character in the text training data, and input a code of each word of different target texts in the long text data into the BILSTM units in different BILSTM networks in the first LSTM network layer. The word coding layer may be a transformer layer or a word 2 vector (i.e., word to vector) layer. That is, the codes of the words of different target texts are input in different BILSTM networks.

In other implementations, if the long text data is text data including a plurality of segments of texts, the second LSTM network layer may include two sub-network layers. A first sub-network layer includes a plurality of BILSTM networks, each BiLSTM network including a plurality of BILSTM units, an input of the BILSTM unit being a feature of a target text output by a corresponding BILSTM network in the first LSTM network layer, and different BILSTM networks outputting features of different segments of texts. The second sub-network layer includes a plurality of BILSTM units, an input of the BiLSTM unit being a feature of a text segment output by a corresponding BiLSTM network in the first sub-network layer, and an output of the second sub-network layer being the feature of the long text data.

In addition, the text training data may include a plurality of pieces of long text data, and accordingly, the text coding module includes a plurality of multi-layer LSTM networks, each multi-layer LSTM network being configured to acquire a feature of one piece of long text data.

Further, the text training data may further include short text data, the short text data being text data containing one target text. Accordingly, the text coding module further includes a short text feature extraction module, configured to extract a feature of the short text data. Of course, in some embodiments, the text of one word may also be used as a short text.

Accordingly, in the embodiment of the present disclosure, the features of the plurality of pieces of long text data and the features of the short text data are concatenated to obtain the text coding features of the text training data.

In addition, in some implementations, text data and image data in the same paper may be extracted. The text data is classified based on semantics to obtain text data of each type. The text data of each type is determined as either the long text data or the short text data based on the number of target texts. The text data of each type is determined as the text training data in the training data pairs, and the image data is determined as the image training data in the training data pairs.

For example, the text data and the image data in the medical paper are extracted, the text data is classified based on semantics to obtain text data of each type, including: an abstract, keywords, and a title. The abstract includes a plurality of sentences and the keywords include a plurality of phrases, which are determined as the long text data, and the title is a sentence, which is determined as the short text data. It is understandable that various types of medical reports are included, such as the medical papers and the like. The medical paper includes a paper title, a paper abstract, paper keywords, and a paper body. The paper title, the paper abstract, and the paper keywords of the medical paper may be selected as the main components of the text data, and case images or images in the paper are used as the image data.

Figure 2:
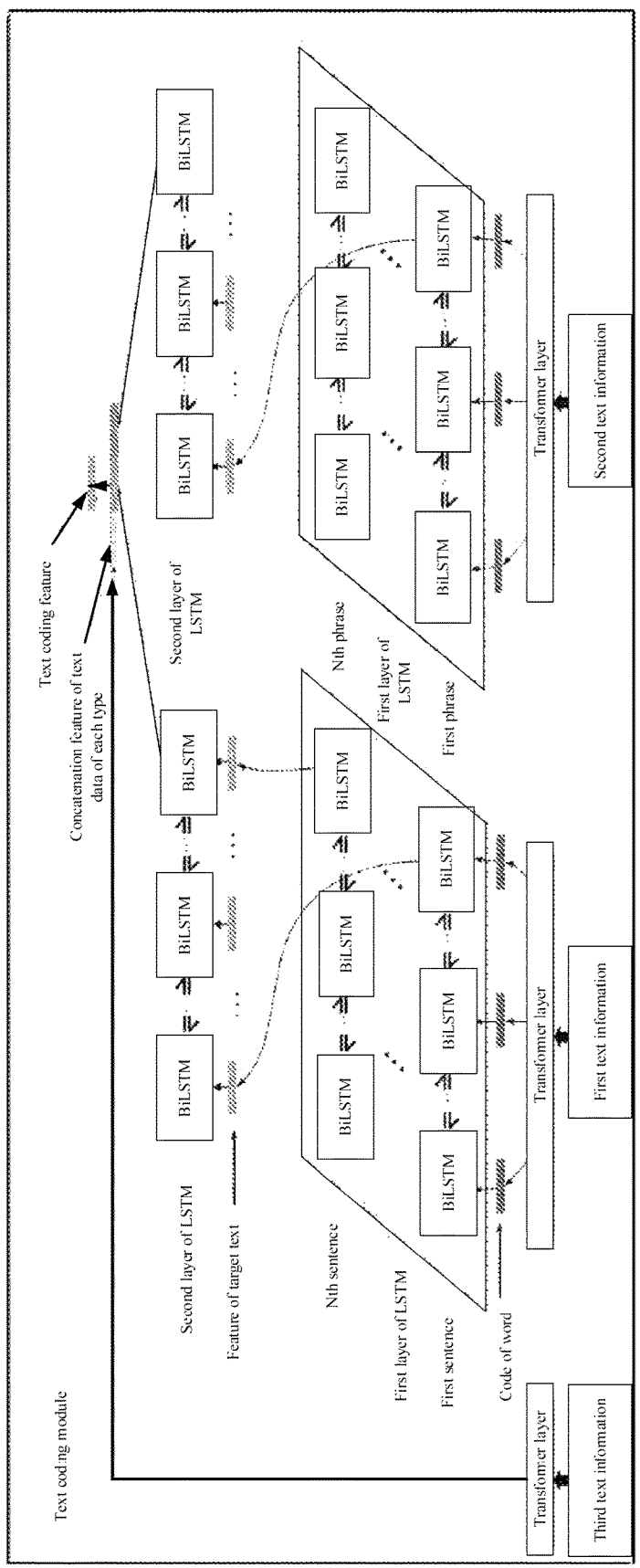
FIG. 2 is a schematic diagram of a text coding module disclosed in the present disclosure.

For example, referring to FIG. 2, FIG. 2 is a schematic diagram of a text coding module disclosed in the present disclosure. The abstract, the keywords, and the title of the medical paper are first text information, second text information, and third text information, respectively. Since the first text information is a paragraph composed of a plurality of sentences, and the second text information is composed of a plurality of phrases, in order to achieve the coding of the first text information and the second text information, the present disclosure provides a cascaded LSTM structure, that is, a multi-layer LSTM network. The input text data of the model includes the first text information, the second text information, and the third text information. All words are coded through the transformer layers, and the transformer layers may code each word into a feature vector, which becomes the representation of the word. Different text information may correspond to different transformer layers. The first text information is coded through the transformer layer, and then each sentence of the first text information is input in different BILSTM networks. The codes of different words are input in different BILSTM units in the BiLSTM network. The BiLSTM network in the first BILSTM network layer is configured to extract the feature representation of each sentence of the first text information, and the feature of the first word or the feature of the last word of each sentence may be selected as the feature representation of the entire sentence. Of course, there are other feature representation methods, for example, a mean value of the features of the words output by all the BiLSTM units in the BiLSTM network is used as the feature of the entire sentence. In this way, the feature representation of each sentence is acquired, a new sequence is combined, the feature of each sentence is input in the BiLSTM unit in the second LSTM network layer, and finally the total feature expression of the first text information is acquired. In FIG. 2, a row of BILSTM units forms one BiLSTM network. The second text information uses the same strategy as the first text information. The second text information is sent to the transformer layer thereof to acquire an embedding feature of each piece of second text information. The embedding feature is sequentially sent to the multi-layer LSTM network corresponding to the second text information to acquire a feature of the second text information. For the third text information, the feature is directly acquired by using the basic transformer model. In this way, three different types of text features are acquired, and the features of all the text information are concatenated. As shown in FIG. 2, different feature vectors are connected end to end and concatenated into a longer vector. Finally, the concatenated vector is subjected to feature mapping through a fully connected layer, and is mapped to an appropriate dimension, that is, a dimension of the code of the word, to obtain the text coding feature, which is configured to perform loss calculation with the image coding features of the image data to train the model. A formula is as follows:

$$e_{rec} = [e_{ttl}, e_{ins}, e_{ing}]$$

Where $e_{ttl}$, $e_{ins}$ and $e_{ing}$ represent the features of the third text information, the first text information, and the second text information, respectively. [ ] represents feature concatenation, that is, the features are connected end to end. $e_{rec}$ represents the concatenated feature, the concatenated feature is subjected to feature mapping through a fully connected layer to obtain a vector with the same dimension as the word, the dimension of the word is the length of the code (vector) of the word, and the text coding features of the text training data are obtained, and are subsequently configured to match the image coding features. A formula is as follows:

$$e'_{rec} = fc(e_{rec})$$

Where $e'_{rec}$ represents the text coding features of the text training data, and fc represents processing of the fully connected layer.

Further, the image training data is an image sequence. The image coding module includes a backbone and a BiLSTM network. In the embodiment of the present disclosure, a feature of each image in the image sequence is extracted by using the backbone to obtain an image feature; and each image feature is input in the BILSTM network to obtain the image coding features.

In addition, in some implementations, the image coding module further includes attention structures. In the embodiment of the present disclosure, each image feature is input in the attention structure to obtain an attention weight of each image feature; and a final feature of each image feature is determined based on the attention weight, and the final feature is input in the BILSTM network to obtain the image coding features.

Figure 3:
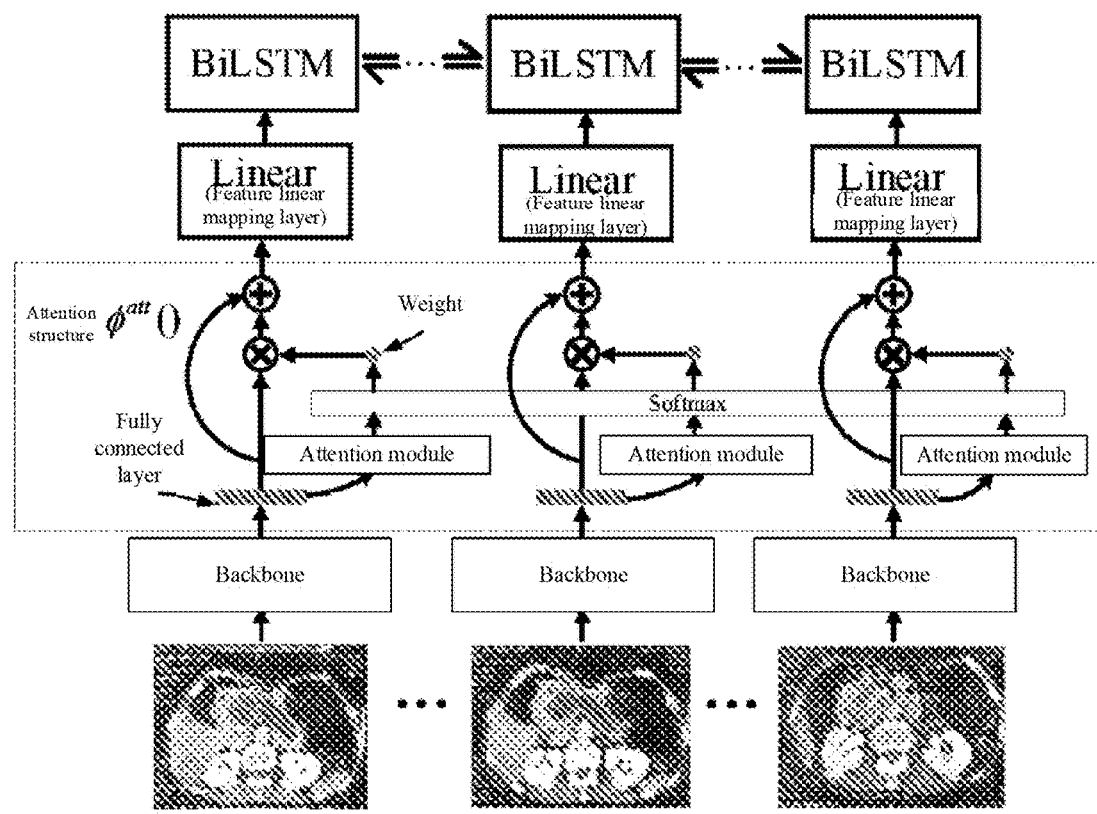
FIG. 3 is a schematic diagram of a specific image coding module disclosed in the present disclosure.

For example, referring to FIG. 3, FIG. 3 is a schematic diagram of a specific image coding module disclosed in an embodiment of the present disclosure. In a specific implementation, the image feature of each image may be extracted by using Residual Network (ResNet) backbones, and the feature of the ResNet in the previous layer of a classification layer is acquired as the image feature of each image. The image features are input in the BILSTM networks, and each image is input into one BILSTM unit in the BiLSTM network to acquire the overall feature of the image sequence, that is, the image coding features. A formula is as follows:

$$\vec{h}_i = \overrightarrow{LSTM}\left(\phi^{att}(x_i^{csi}), \vec{h}_{i-1}\right), i \in [1, I]$$

$$\overleftarrow{h}_i = \overleftarrow{LSTM}\left(\phi^{att}(x_i^{csi}), \overleftarrow{h}_{i+1}\right), i \in [I, 1]$$

Similarly, the image sequence also includes a reverse sequence and a sequence, both implying temporal semantic information. The embodiment of the present disclosure performs coding on the image sequence by using the above formula.

Where BiLSTM represents each BILSTM unit of the BiLSTM network. $\overline{h}_i$, is an output of the i-th BILSTM unit. $x_j^{csi}$ represents the image feature, i represents the i-th image, → represents the sequence, ← represents the reverse sequence, I represents that the BiLSTM network includes I images, $\varphi^{att}(\ )$ represents the attention structure, and fc represents the fully connected layer. In some implementations, a mean value of the feature coding outputs of the BILSTM units may be used as the output of the BiLSTM network. A formula is as follows:

$$e_{csi} = \left(\sum_{i=1}^{I} \vec{h}_i + \sum_{i=1}^{I} \overleftarrow{h}_i\right)/2I$$

Where $e_{csi}$ represents image feature coding.

Figure 4:
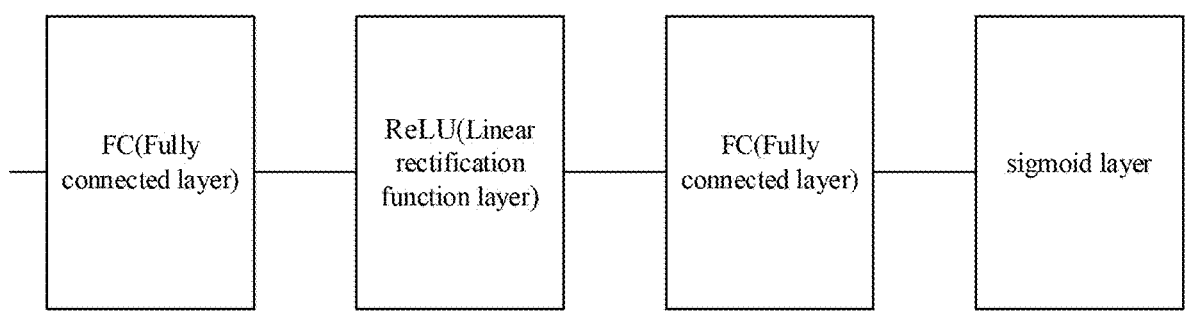
FIG. 4 is a schematic diagram of an attention module disclosed in the present disclosure.

Further, in practical applications, most image data are sequence images, such as medical images. The importance of images in the sequence image is different. The present disclosure designs the attention structure to screen the image sequence, so that BILSTM can focus more on useful information. The attention module designed in the present disclosure includes fully connected layers, attention modules, softmax layers, multiplication modules, and addition modules. The attention module is as shown in FIG. 4, and includes two fully connected layers FC and a ReLU (i.e., Linear rectification function) layer. In the present disclosure, the image acquires an embedding feature after passing through the backbone, and the embedding feature acquires a final embedding feature e of each image after passing through the fully connected layer. The final embedding feature e may calculate the weight of each feature by means of passing through the attention module. The weight is a number and is normalized through a sigmoid layer. The weights of the features of all the images may uniformly enter the softmax layers to determine which image is important. Finally, the feature weight of the image passing through the softmax layer may be multiplied by a corresponding final embedding feature e of each image. That is, in the embodiment of the present disclosure, the feature of each image in the image sequence may be extracted by using the backbone to obtain the image feature, the image feature is input in the fully connected layer to obtain the embedding feature, each embedding feature is input in the attention module to obtain the attention weight of each image feature, then the attention weight is processed through the softmax layer, the final feature of each image feature is determined based on the attention weight processed by the softmax layer, and the final feature is input in the BiLSTM network to obtain the image coding features. The embodiment of the present disclosure introduces the idea of the ResNet, and for each image, the output of the attention structure thereof is as shown in the following formula:

$$\phi^{att}(x_i^{csi}) = \text{Attention}(x_i^{csi}) \cdot x_i^{csi} + x_i^{csi}$$

Then through fc (that is, the fully connected layer), $fc(\phi^{att}(x_j^{csi}))$ is input in the BILSTM network to obtain the image coding features.

At S13, a training loss is calculated based on the text coding features and the image coding features, and parameter adjustment is performed on the initial model based on the training loss.

In some implementations, positive samples and negative samples corresponding to anchor samples are determined for N coding feature pairs of N training data pairs in a batch. Each coding feature pair is a coding pair composed of the text coding feature and the image coding feature of the training data pair, each anchor sample is any text coding feature or image coding feature in the N coding feature pairs, the positive sample is the other coding feature paired with the anchor sample, and the negative sample is all the coding features except the other coding feature in the N coding feature pairs. The training loss is calculated based on the anchor samples, and the positive samples and the negative samples corresponding to the anchor samples. A used formula is as follows:

$$L_{TriHard}^b = \frac{1}{N}\sum_{a=1}^{N}[\Delta + \|e_a^{csi}, e_p^{rec}\|^2 - \min\|e_a^{csi}, s_{np}\|^2] +$$

$$\frac{1}{N}\sum_{a=1}^{N}[\Delta + \|e_a^{rec}, e_p^{csi}\|^2 - \min\|e_a^{rec}, s_{np}\|^2]$$

Figure 5:
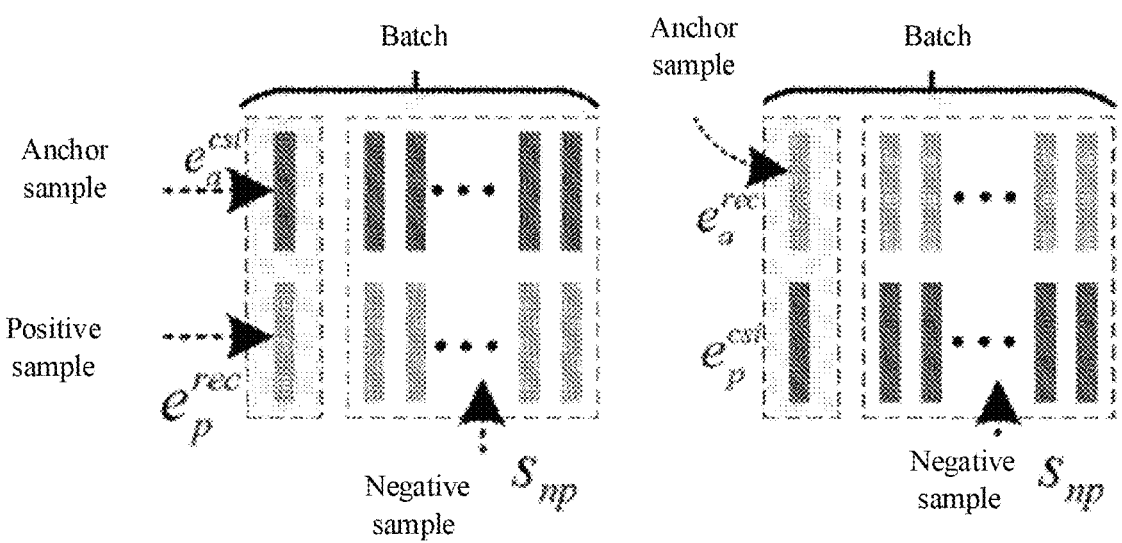
FIG. 5 is a schematic diagram of a specific positive sample and negative sample disclosed in the present disclosure.

The training data in the present disclosure appears in pairs. One text coding feature corresponds to one image coding feature. In the loss function design, for this pair of data, the present disclosure may traverse each image coding feature and text coding feature to calculate a mean value of the loss. As shown in the above formula, traversal is performed a total of N times, and N represents a total of N paired samples in this batch. First, the image feature code $e_a^{csi}$ is traversed (N in total), the selected image feature code traversed is called $e_a^{csi}$ and a represents anchor (anchor sample). A text feature code paired with the anchor sample is denoted as, and p represents positive. Similarly, all the remaining samples that are not paired with $e_a^{csi}$ in this batch are denoted as $S_{np}$. $\Delta$ is a hyperparameter, which is fixed during training, and may be set to 0.4 in the present disclosure. Similarly, the same traversal operation is also performed on the text feature code, $e_a^{rec}$ represents the sample selected in the traversal, the positive image feature coding sample corresponding thereto is denoted as, $e_p^{csi}$, and the one not corresponding thereto is denoted as $S_{np}$. Referring to FIG. 5, FIG. 5 is a schematic diagram of a specific positive sample and negative sample disclosed in an embodiment of the present disclosure. Where min represents a minimum operation, $L_{TriHard}^b$ is a target triplet loss, and $\|\ \|$ represents that a distance is calculated. In some implementations, the target triplet loss is a training loss, and gradient back propagation may be performed in the training by using the above loss function to update cascaded Transformer, BiLSTM and ResNet parameters.

At S14, if the training loss meets a convergence condition, the initial model after the parameter adjustment is determined as an image-text mutual retrieval model.

In some implementations, it may be determined whether the training loss is less than a preset threshold. If the training loss is less than the preset threshold, it is determined that the training loss meets the convergence condition; and if the training loss is greater than the preset threshold, it is determined that the training loss does not meet the convergence condition.

It can be seen that, in the embodiment of the present disclosure, the training data pairs are acquired; the training data pairs include the text training data and the image training data, the text training data including the long text data, the long text data being the text data containing the plurality of target texts, and the target text being the sentence or the phrase; and then the training data pairs are input in the initial model, and the text coding features of the text training data and the image coding features of the image training data are extracted by using the text coding module and the image coding module in the initial model, respectively; the text coding module includes the multi-layer LSTM network, the multi-layer LSTM network including the first LSTM network layer and the second LSTM network layer, the first LSTM network layer being configured to acquire the feature of each target text based on the feature of each word in each target text, and the second LSTM network layer being configured to acquire the feature of the long text data based on the feature of each target text; then the training loss is calculated based on the text coding features and the image coding features, and parameter adjustment is performed on the initial model based on the training loss; and if the training loss meets the convergence condition, the initial model after the parameter adjustment is determined as the image-text mutual retrieval model. That is, in the embodiment of the present disclosure, the features of the text training data are extracted by using the multi-layer LSTM network, the feature of each sentence or phrase is acquired by using the first LSTM network based on the feature of each word in each target text, and then the feature of the long text data is acquired by using the second LSTM network layer based on the feature of each sentence or phrase, so that the problem of information forgetting between words, sentences or phrases that are far apart in the long text data is solved, richer text information is obtained, and the performance of the image-text mutual retrieval model can be improved, thereby improving the accuracy of image-text mutual retrieval.

Figure 6:
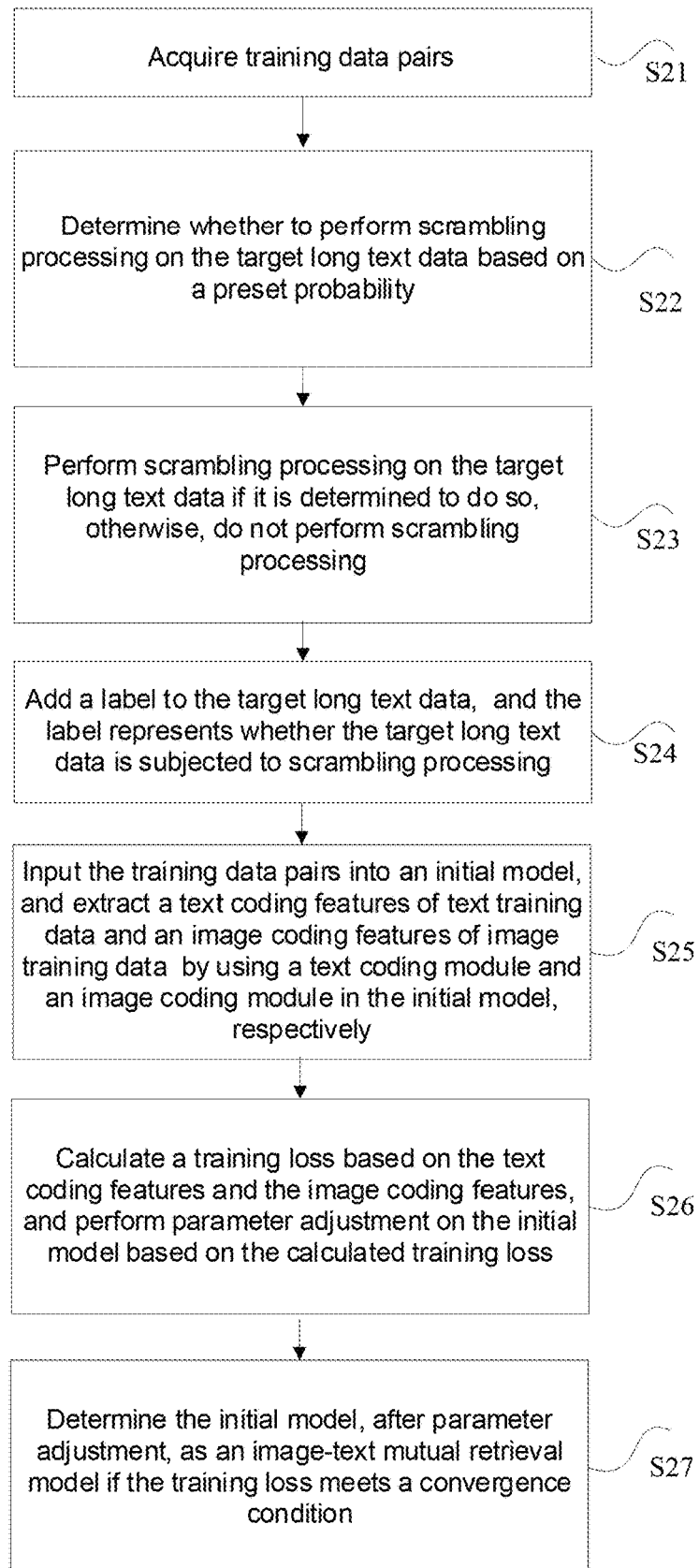
FIG. 6 is a flowchart of a specific image-text mutual retrieval model training method disclosed in the present disclosure.

Referring to FIG. 6, the embodiments of the present disclosure disclose a specific image-text mutual retrieval model training method, including the following operations.

At S21, training data pairs are acquired. The training data pairs includes text training data and image training data, the text training data including long text data, the long text data being text data containing a plurality of target texts, and the target text being a sentence or a phrase.

At S22, it is determined whether to perform scrambling processing on target long text data based on a preset probability. The target long text data is long text data with a temporal relationship between sentences in the text training data.

At S23, if it is determined to perform scrambling processing on the target long text data, scrambling processing is performed on the target long text data, otherwise scrambling processing is not performed on the target long text data.

In some implementations, a preset proportion of sentences may be selected, and position exchange is performed on the selected sentences to implement scrambling processing.

It is to be noted that, the first text information, that is, the abstract, in the foregoing embodiments usually has a context or time sequence relationship. If the sentences are scrambled, the specific content of the abstract may not be known. In some implementations, for the first text information, the text information is randomly selected to be scrambled or not scrambled with a probability of 50%. If the first text information is selected to be scrambled, 30% of the sentences are randomly extracted from the sentences of the first text information. The extracted sentences in the first text information exchange positions with each other, and the un-extracted sentences remain in their original positions. New first text information, that is, the first text information after scrambling, may be acquired through the above exchange step.

At S24, a label is added to the target long text data, the label representing whether the target long text data has subjected to scrambling processing.

At S25, the training data pairs are input in an initial model, and a text coding features of the text training data and an image coding features of the image training data are extracted by using a text coding module and an image coding module in the initial model, respectively. The text coding module includes multi-layer LSTM networks, the multi-layer LSTM network including first LSTM network layers and second LSTM network layers, the first LSTM network layer being configured to acquire a feature of each target text based on a feature of each word in each target text, and the second LSTM network layer being configured to acquire a feature of the long text data based on the feature of each target text.

At S26, a training loss is calculated based on the text coding features and the image coding features, and parameter adjustment is performed on the initial model based on the training loss.

In some implementations, the operation that the training loss is calculated specifically includes the following steps.

At S260, a target triplet loss is calculated based on the anchor samples, and the positive samples and the negative samples corresponding to the anchor samples.

The specific computing process of above S260 may refer to the contents disclosed in the foregoing embodiments, which will not be elaborated here.

At S261, a temporal constraint loss is calculated based on a feature of the target long text data and the label of the target long text data.

In some implementations, a formula used is as follows:

$$L_{seq}^{ins} = -\left(\sum_{i=1}^{B}(y_i\log(p_i) + (1-y_i)\log(1-p_i))\right)/B$$

Where B represents batch size, $y_i \in \{0, 1\}$ represents a true value label of whether the target long text data is scrambled, pi represents a probability value of determining whether the target long text data is scrambled by using the feature of the target long text data, and $L_{seq}^{ins}$ represents the temporal constraint loss.

At S262, the training loss is calculated by using the target triplet loss and the temporal constraint loss.

In some implementations, a formula of the training loss is as follows:

$$L = L_{TriHard}^{b} + L_{seq}^{ins}$$

Where L represents the total training loss.

At S27, if the training loss meets a convergence condition, the initial model after the parameter adjustment is determined as an image-text mutual retrieval model.

Figure 7:
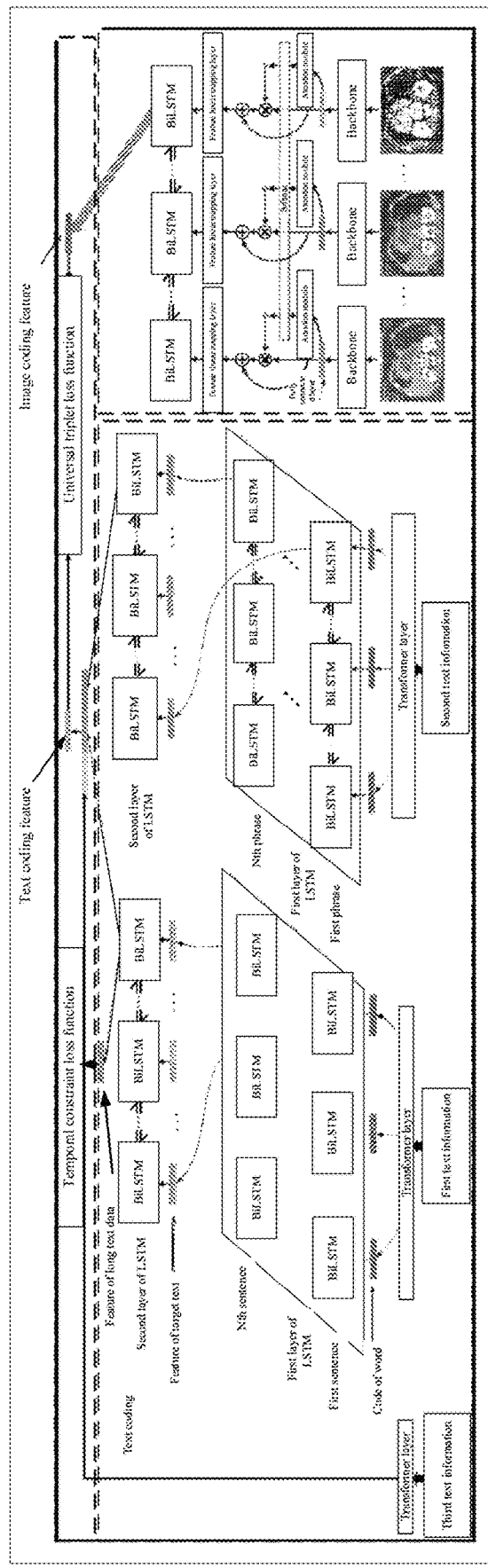
FIG. 7 is a schematic diagram of training of a specific image-text mutual retrieval model disclosed in the present disclosure.

For example, referring to FIG. 7, FIG. 7 is a schematic diagram of training of a specific image-text mutual retrieval model disclosed in an embodiment of the present disclosure. An image-text retrieval network based on a cascaded LSTM is constructed, including a text coding module and an image feature coding module. A universal triplet loss, that is, a target triplet loss, is established. A temporal constraint loss function is established. The network is trained according to the above loss function, so as to be converged. A network training process is divided into two stages. The first stage is a stage of propagating data from a low level to a high level, that is, a forward propagation stage. Another stage is a stage of propagating an error from the high level to the low level, that is, a back propagation stage, when a result obtained by the forward propagation is not in line with an expectation. The training process is specifically as follows: all network layer weights are initialized, generally using random initialization; and input images and text data are forward propagated through neural networks, convolution layers, downsampling layers, fully connected layers, and other layers to obtain an output value; and an output value of the network is calculated to obtain a loss of the output value of the network. The loss is transmitted back to the network, and a back propagation error of each layer of the network is sequentially obtained. Each layer of the network adjusts all weight coefficients in the network based on the back propagation error of each layer, that is, updates the weights. A new batch of image text data is randomly selected again to obtain an output value through forward propagation of the network. Infinite reciprocating iteration is performed, when the loss corresponding to the calculated output value of the network is less than a certain threshold, or the number of iterations exceeds a certain threshold, the training ends. The trained network parameters of all the layers are saved.

It can be understood that, through the temporal constraint loss function provided in the present disclosure, the contextual relationship and temporal dependence between the sentences can be further captured, and the logical relationship between the extracted sentences can be more abstractly extracted to obtain richer text information, thereby further improving the performance of the image-text mutual retrieval model, and improving the accuracy of image-text mutual retrieval.

Figure 8:
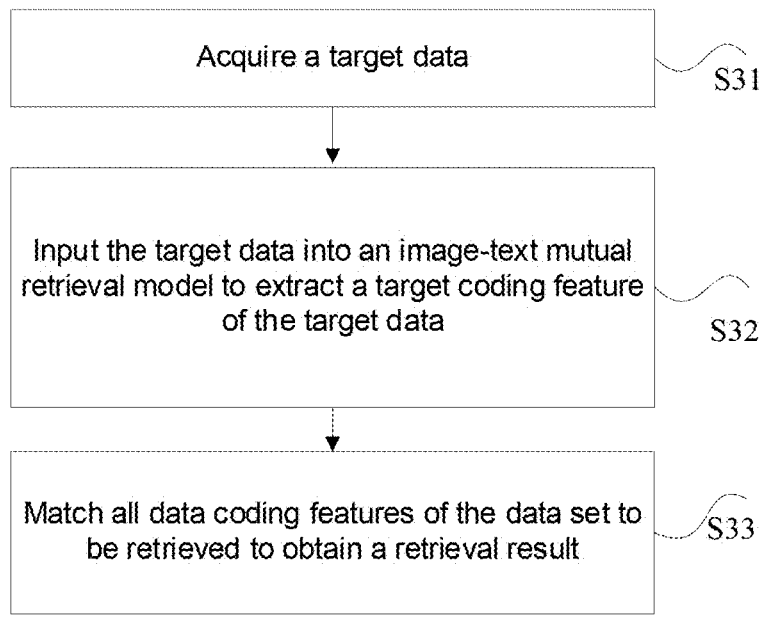
FIG. 8 is a flowchart of an image-text mutual retrieval method disclosed in the present disclosure.

Referring to FIG. 8, the embodiments of the present disclosure disclose an image-text mutual retrieval method, including the following operations.

At S31, target data is acquired. The target data is image data or text data.

At S32, the target data is input in an image-text mutual retrieval model, so that the image-text mutual retrieval model extracts a target coding feature of the target data. The image-text mutual retrieval model is obtained based on the image-text mutual retrieval model training method in the aforementioned embodiment.

At S33, all data coding features of a data set to be retrieved are matched to obtain a retrieval result.

In some embodiments, a vector distance, such as a Euclidean distance, between the target coding feature and all the data coding features may be calculated, and the data coding feature with the smallest distance is determined as a retrieval result.

If the target data is the image data, all the data coding features are text coding features, and if the target data is the text data, all the data coding features are image coding features.

For example, feature extraction is performed on medical texts or medical images by using the image-text mutual retrieval model and stored in the data set to be retrieved. A user gives any medical text data or medical image data, which is called query data. A feature of the query data is extracted by using the image-text mutual retrieval model. Distance matching is performed on the feature of the query data and all sample features in the data set to be retrieved, that is, the vector distance is calculated. For example, the Euclidean distance is calculated. If the query data is medical text data, all the medical image features in the data set to be retrieved are taken to calculate the distance. Similarly, if the query data is medical image data, the Euclidean distance is calculated with all the medical text features in the data set to be retrieved, and the sample with the smallest distance is a recommended sample for output.

It is to be noted that, a medical image-text database and an image-text report system are of great value for information retrieval, talent training, and data mining and protection. With the advent of the information age, digital, standardized and networked operations have entered the medical imaging world. Brand-new digital imaging technologies are being applied to clinical practice, such as Computed Tomography (CT), Magnetic Resonance (MR), Digital Subtraction Angiography (DSA), Positron Emission Computed Tomography (PET), Computed Radiography (CR), Digital radiography (DR), etc. The networking of medical imaging diagnostic devices and the computerization, standardization and normalization of imaging diagnostic reports have gradually become the inevitable development trend of medical imaging examination departments. Some simple and easy-to-use medical imaging reports and data management systems based on massive medical reports allow more medical imaging physicians to experience the convenience and rapidness brought by high and new technologies and modern devices. It is of great value to facilitate the retrieval and search of the medical records and learning of a lot of difficult imaging knowledge. Medical data source channels are diverse. Through the solution provided in the present disclosure, a large-scale medical multimodal database is constructed to optimize a data query mode in the medical field. When a doctor uses the database to query information, the doctor can screen the desired data only by simple description, which makes the query method more convenient and saves manpower and time costs. In addition, the field of medical paper retrieval is not included in the embodiment of the present disclosure. Any multi-text type retrieval task, such as description retrieval, may also be adapted.

Figure 9:
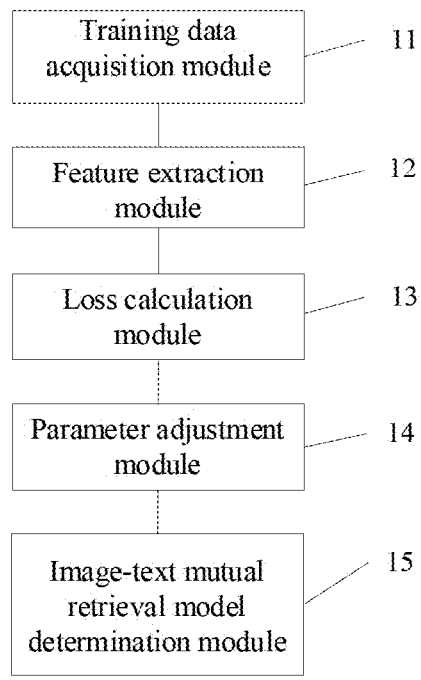
FIG. 9 is a schematic structural diagram of an image-text mutual retrieval model training apparatus disclosed in present disclosure.

Referring to FIG. 9, the embodiments of the present disclosure disclose an image-text mutual retrieval model training apparatus, including a training data acquisition module 11, a feature extraction module 12, a loss calculation module 13, a parameter adjustment module 14, and an image-text mutual retrieval model determination module 15.

The training data acquisition module 11 is configured to acquire training data pairs. The training data pairs include text training data and image training data, the text training data including long text data, the long text data being text data containing a plurality of target texts, and the target text being a sentence or a phrase.

The feature extraction module 12 is configured to input the training data pairs in an initial model, and extract text coding features of the text training data and an image coding features of the image training data by using a text coding module and an image coding module in the initial model, respectively. The text coding module includes a multi-layer LSTM network, the multi-layer LSTM network including a first LSTM network layer and a second LSTM network layer, the first LSTM network layer being configured to acquire a feature of each target text based on a feature of each word in each target text, and the second LSTM network layer being configured to acquire a feature of the long text data based on the feature of each target text.

The loss calculation module 13 is configured to calculate a training loss based on the text coding features and the image coding features.

The parameter adjustment module 14 is configured to perform parameter adjustment on the initial model based on the training loss.

The image-text mutual retrieval model determination module 15 is configured to determine, if the training loss meets a convergence condition, the initial model after the parameter adjustment as an image-text mutual retrieval model.

It can be seen that, in the embodiment of the present disclosure, the training data pairs are acquired; the training data pairs includes the text training data and the image training data, the text training data including the long text data, the long text data being the text data containing the plurality of target texts, and the target text being the sentence or the phrase; and then the training data pairs are input in the initial model, and the text coding features of the text training data and the image coding features of the image training data are extracted by using the text coding module and the image coding module in the initial model, respectively; the text coding module includes the multi-layer LSTM network, the multi-layer LSTM network including the first LSTM network layer and the second LSTM network layer, the first LSTM network layer being configured to acquire the feature of each target text based on the feature of each word in each target text, and the second LSTM network layer being configured to acquire the feature of the long text data based on the feature of each target text; then the training loss is calculated based on the text coding features and the image coding features, and parameter adjustment is performed on the initial model based on the training loss; and if the training loss meets the convergence condition, the initial model after the parameter adjustment is determined as the image-text mutual retrieval model. That is, in the embodiment of the present disclosure, the features of the text training data are extracted by using the multi-layer LSTM network, the feature of each sentence or phrase is acquired by using the first LSTM network based on the feature of each word in each target text, and then the feature of the long text data is acquired by using the second LSTM network layer based on the feature of each sentence or phrase, so that the problem of information forgetting between words, sentences or phrases that are far apart in the long text data is solved, richer text information is obtained, and the performance of the image-text mutual retrieval model can be improved, thereby improving the accuracy of image-text mutual retrieval.

The first LSTM network layer includes a plurality of BiLSTM networks, each BiLSTM network including a plurality of BILSTM units. Different BILSTM units are configured to extract the features of different words, and different BiLSTM networks output the features of different target texts. The second LSTM network layer includes a plurality of BILSTM units, an input of the BILSTM unit being a feature of the target text output by a corresponding BiLSTM network in the first LSTM network layer.

The text training data includes a plurality of pieces of long text data, and accordingly, the text coding module includes a plurality of multi-layer LSTM networks, each multi-layer LSTM network being configured to acquire a feature of one piece of long text data.

In addition, the text training data further includes short text data, the short text data being text data containing one target text. Accordingly, the text coding module further includes a short text feature extraction module, configured to extract a feature of the short text data.

Further, the feature extraction module 12 is specifically configured to concatenate the features of the plurality of pieces of long text data and the features of the short text data to obtain the text coding features of the text training data.

In some implementations, the training data acquisition module 11 is specifically configured to extract text data and image data in the same paper; classify the text data based on semantics to obtain text data of each type; determine the text data of each type as either the long text data or the short text data based on the number of target texts; and determine the text data of each type as the text training data in the training data pair, and determine the image data as the image training data in the training data pairs.

In some implementations, the image training data is an image sequence. The image coding module includes a backbone and a BiLSTM network, and accordingly, the feature extraction module 12 is specifically configured to extract a feature of each image in the image sequence by using the backbone to obtain an image feature; and input each image feature into the BiLSTM network to obtain the image coding features.

In some implementations, the image coding module further includes attention structures, and accordingly, the feature extraction module 12 is specifically configured to input each image feature into the attention structure to obtain an attention weight of each image feature; and determine a final feature of each image feature based on the attention weight, and input the final feature into the BiLSTM network to obtain the image coding features.

In some implementations, the loss calculation module 13 is specifically configured to determine positive samples and negative samples corresponding to an anchor samples for N coding feature pairs of N training data pairs in a batch, where each coding feature pair is a coding pair composed of the text coding feature and the image coding feature of the training data pair, each anchor sample is any text coding feature or image coding feature in the N coding feature pairs, the positive sample is the other coding feature paired with the anchor sample, and the negative sample is all the coding features except the other coding feature in the N coding feature pairs; and calculate the training loss based on the anchor samples, and the positive samples and the negative samples corresponding to the anchor samples.

In some other implementations, the apparatus further includes a scrambling processing module.

The scrambling processing module is configured to determine whether to perform scrambling processing on target long text data based on a preset probability, where the target long text data is long text data with a temporal relationship between sentences in the text training data; perform, if it is determined to perform scrambling processing on the target long text data, scrambling processing on the target long text data, otherwise not perform scrambling processing on the target long text data; and add a label to the target long text data, the label representing whether the target long text data has subjected to scrambling processing.

Accordingly, the loss calculation module 13 is specifically configured to calculate a temporal constraint loss based on a feature of the target long text data and the label of the target long text data; calculate a target triplet loss based on the anchor samples, and the positive samples and the negative samples corresponding to the anchor samples; and calculate the training loss by using the target triplet loss and the temporal constraint loss.

Figure 10:
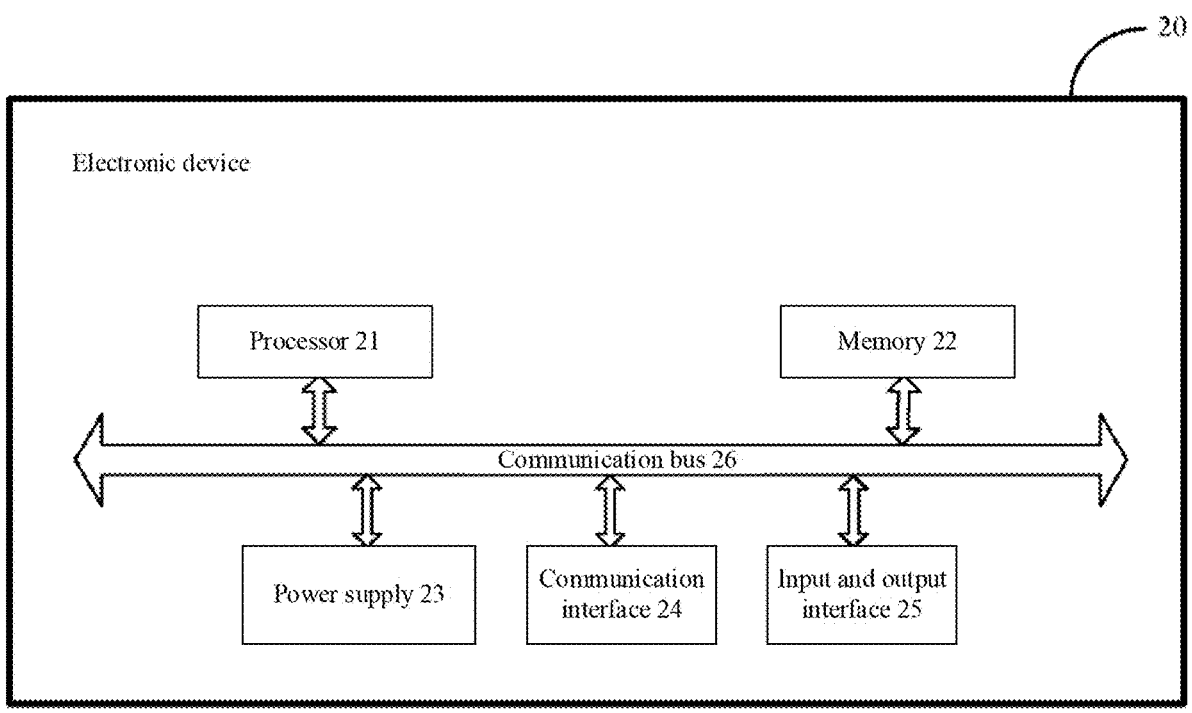
FIG. 10 is a structural diagram of an electronic device disclosed in the present disclosure.

Referring to FIG. 10, the embodiments of the present disclosure discloses an electronic device 20, including a processor 21 and a memory 22. The memory 22 is configured to store computer programs. The processor 21 is configured to execute the computer programs to implement the image-text mutual retrieval model training method disclosed in the foregoing embodiments, and/or, the aforementioned image-text mutual retrieval method.

The specific process of the above image-text mutual retrieval model training method, and/or, the aforementioned image-text mutual retrieval method may refer to the corresponding contents disclosed in the foregoing embodiments, which will not be elaborated here.

Furthermore, the memory 22, as a carrier for resource storage, may be a Read Only Memory (ROM), a Random Access Memory (RAM), a magnetic disk or a Compact Disc (CD), and the storage manner may be transient storage or permanent storage.

In addition, the electronic device 20 further includes power supplies 23, communication interfaces 24, input and output interfaces 25, and communication buses 26. The power supplies 23 are configured to provide operating voltage for each hardware device on the electronic device 20. The communication interfaces 24 can create data transmission channels with external devices for the electronic device 20, and the communication protocol followed is any communication protocol that can be applied to the technical solution of the present disclosure, which is not specifically limited here. The input and output interfaces 25 are configured to acquire external input data or output data to the outside, and the specific interface type may be selected according to specific application needs, which is not specifically limited here.

Figure 11:
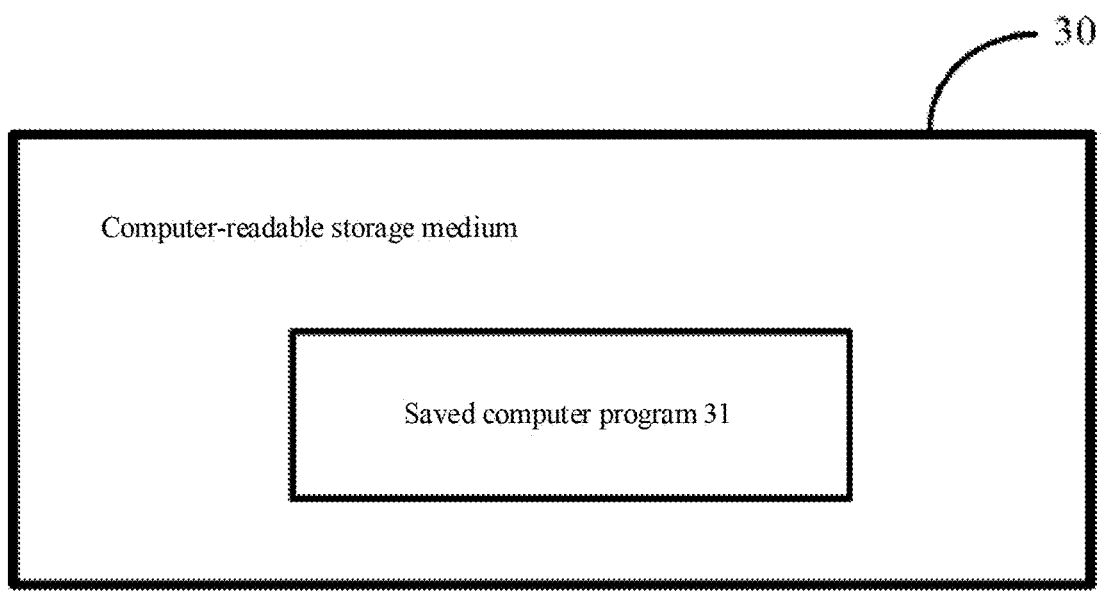
FIG. 11 is a schematic structural diagram of a non-volatile readable storage medium disclosed in the present disclosure.

Further, referring to FIG. 11, the embodiments of the present disclosure further disclose a non-volatile readable storage medium 30, configured to store computer programs 31. The computer programs 31, when executed by a processor, implement the image-text mutual retrieval model training method disclosed in the foregoing embodiments, and/or, the aforementioned image-text mutual retrieval method.

The specific process of the above image-text mutual retrieval model training method, and/or, the aforementioned image-text mutual retrieval method may refer to the corresponding contents disclosed in the foregoing embodiments, which will not be elaborated here.

The various embodiments in the present specification are described in a progressive manner, and each embodiment focuses on differences from other embodiments, and the same or similar parts between the various embodiments may be referred to each other. For the apparatus disclosed in the embodiment, since it corresponds to the method disclosed in the embodiment, the description is relatively simple, and the relevant parts can be referred to the method part.

The steps of the method or algorithm described in combination with the embodiments disclosed herein may be implemented directly by hardware, a software module executed by a processor, or a combination of the two. The software module may be placed in an RAM, a memory, an ROM, an electrically programmable ROM, an electrically erasable programmable ROM, a register, a hard disk, a removable disk, a CD-ROM, or any other form of storage medium known in the technical field.

The image-text mutual retrieval model training method and apparatus, the image-text mutual retrieval method and the device provided in the present disclosure are described in detail above. The principles and implementations of the present disclosure are described herein using specific examples, the foregoing description of the examples are only used to help the understanding of the method and core concept of the present disclosure. At the same time, for those of ordinary skill in the art, according to the concept of the present disclosure, there will be changes in the specific implementation modes and the application scope. In summary, the contents of the present description should not be construed as limiting the present disclosure.

What is claimed is:

1. A method for training an image-text mutual retrieval model, comprising:

acquiring training data pairs, wherein the training data pairs comprise text training data and image training data, the text training data comprises long text data, the long text data is text data containing a plurality of target texts, and the target text is a sentence or a phrase;

inputting the training data pairs into an initial model, extracting text coding features of the text training data by using a text coding module in the initial model, and extracting image coding features of the image training data by using an image coding module in the initial model, respectively, wherein the text coding module comprises multi-layer Long-Short Term Memory (LSTM) networks, the multi-layer LSTM networks comprising a first LSTM network layer and a second LSTM network layer, the first LSTM network layer being configured to acquire a feature of each target text based on a feature of each word in each target text, and the second LSTM network layer being configured to acquire a feature of the long text data based on the feature of each target text;

calculating a training loss based on the text coding features and the image coding features, and performing parameter adjustment on the initial model based on the training loss; and in response to the training loss meeting a convergence condition, determining the initial model after the parameter adjustment as the image-text mutual retrieval model.

2. The method for training the image-text mutual retrieval model according to claim 1, wherein the first LSTM network layer comprises a plurality of Bi-directional LSTM (BiLSTM) networks, each BiLSTM network comprising a plurality of BiLSTM units; different BiLSTM units are configured to extract features of different words, and different BiLSTM networks output features of different target texts; and the second LSTM network layer comprises a plurality of BiLSTM units, an input of the BiLSTM unit being the feature of the target text output by corresponding BiLSTM network in the first LSTM network layer.

3. The method for training the image-text mutual retrieval model according to claim 1, wherein the text training data comprises a plurality of pieces of long text data, and accordingly, the text coding module comprises a plurality of multi-layer LSTM networks, each multi-layer LSTM network being configured to acquire a feature of one piece of long text data.

4. The method for training the image-text mutual retrieval model according to claim 3, wherein the text training data further comprises short text data, the short text data being text data containing one target text; and accordingly, the text coding module further comprises a short text feature extraction module, configured to extract a feature of the short text data.

5. The method for training the image-text mutual retrieval model according to claim 4, wherein extracting text coding features of the text training data by using a text coding module in the initial model comprises:
concatenating the features of the plurality of pieces of long text data and the features of the short text data to obtain the text coding features of the text training data.

6. The method for training the image-text mutual retrieval model according to claim 4, wherein acquiring training data pairs comprises:
extracting text data and image data in a same paper;
classifying the text data based on semantics to obtain text data of each type;
determining the text data of each type as either the long text data or the short text data based on the number of target texts; and
determining the text data of each type as the text training data in the training data pairs, and determining the image data as the image training data in the training data pairs.

7. The method for training the image-text mutual retrieval model according to claim 1, wherein the image training data is an image sequence; and the image coding module comprises a backbone and a BiLSTM network, and accordingly, extracting image coding features of the image training data by using the image coding module comprises:
extracting a feature of each image in the image sequence by using the backbone to obtain an image feature; and
inputting each image feature into the BiLSTM network to obtain the image coding features.

8. The method for training the image-text mutual retrieval model according to claim 7, wherein the image coding module further comprises an attention structure, and accordingly, inputting each image feature into the BiLSTM network to obtain the image coding features comprises:
inputting each image feature into the attention structure to obtain an attention weight of each image feature; and
determining a final feature of each image feature based on the attention weight, and inputting the final feature into the BiLSTM network to obtain the image coding features.

9. The method for training the image-text mutual retrieval model according to claim 1, wherein the calculating a training loss based on the text coding features and the image coding features comprises:
determining positive samples and negative samples corresponding to anchor samples for N coding feature pairs of N training data pairs in a batch, wherein each coding feature pair is a coding pair composed of the text coding feature and the image coding feature of the training data pair, each anchor sample is any text coding feature or image coding feature in the N coding feature pairs, the positive sample is the other coding feature paired with the anchor sample, and the negative sample is all the coding features except the other coding feature in the N coding feature pairs; and
calculating the training loss based on the anchor samples, and the positive samples and the negative samples corresponding to the anchor samples.

10. The method for training the image-text mutual retrieval model according to claim 9, before inputting the training data into the initial model, further comprising:
determining whether to perform scrambling processing on target long text data based on a preset probability, wherein the target long text data is long text data with a temporal relationship between sentences in the text training data;
in response to the determination to perform scrambling processing on the target long text data, performing scrambling processing on the target long text data, and in response to a determination not to perform scrambling on the target long text data, not performing scrambling processing on the target long text data; and
adding a label to the target long text data, the label representing whether the target long text data has been subjected to scrambling processing.

11. The method for training the image-text mutual retrieval model according to claim 10, further comprising:
calculating a temporal constraint loss based on a feature of the target long text data and the label of the target long text data.

12. The method for training the image-text mutual retrieval model according to claim 11, wherein the calculating the training loss based on the anchor samples, and the positive samples and the negative samples corresponding to the anchor samples comprises:
calculating a target triplet loss based on the anchor samples, and the positive samples and the negative samples corresponding to the anchor samples; and
calculating the training loss by using the target triplet loss and the temporal constraint loss.

13. An image-text mutual retrieval method, comprising:
acquiring target data, wherein the target data is image data or text data;
inputting the target data into an image-text mutual retrieval model, so that the image-text mutual retrieval model extracts a target coding feature of the target data, wherein the image-text mutual retrieval model is obtained based on the method for training the image-text mutual retrieval model according to claim 1; and
matching all data coding features of a data set to be retrieved to obtain a retrieval result;
wherein in response to the target data being the image data, all the data coding features are text coding features, and in response to the target data being the text data, all the data coding features are image coding features.

14. An electronic device, comprising a memory and a processor, wherein,
the memory is configured to store computer programs; and
the processor is configured to execute the computer programs to implement the following steps:
acquiring training data pairs, wherein the training data pairs comprise text training data and image training data, the text training data comprising long text data, the long text data being text data containing a plurality of target texts, and the target text being a sentence or a phrase;

inputting the training data pairs in an initial model, and extracting text coding features of the text training data and image coding features of the image training data by using a text coding module and an image coding module in the initial model, respectively, wherein the text coding module comprises multi-layer LSTM networks, the multi-layer LSTM network comprising first LSTM network layers and second LSTM network layers, the first LSTM network layer being configured to acquire a feature of each target text based on a feature of each word in each target text, and the second LSTM network layer being configured to acquire a feature of the long text data based on the feature of each target text;

calculating a training loss based on the text coding features and the image coding features, and performing parameter adjustment on the initial model based on the training loss; and in response to the training loss meeting a convergence condition, determining the initial model after the parameter adjustment as an image-text mutual retrieval model.

15. The method for training the image-text mutual retrieval model according to claim 2, wherein the text coding module comprises word coding layers, configured to input a code of each word of different target texts in the long text data into the BiLSTM units in different BiLSTM networks in the first LSTM network layer.

16. The method for training the image-text mutual retrieval model according to claim 2, wherein the long text data is text data comprising a plurality of segments of texts; the second LSTM network layer comprises two sub-network layers, wherein a first sub-network layer comprises a plurality of BiLSTM networks, a corresponding BiLSTM network in each first sub-network layer comprising a plurality of BiLSTM units, an input of a corresponding BiLSTM unit in the first sub-network layer being a feature of the target text output by a corresponding BiLSTM network in the first LSTM network layer, and corresponding BiLSTM networks in different BiLSTM networks outputting features of different segments of texts; and the second sub-network layer comprises a plurality of BiLSTM units, an input of a corresponding BILSTM unit in the second sub-network layer being a feature of a text segment output by a corresponding BiLSTM network in the first sub-network layer, and an output of the second sub-network layer being a feature of the long text data.

17. The method for training the image-text mutual retrieval model according to claim 10, wherein the performing scrambling processing on the target long text data comprises:

selecting a preset proportion of sentences, and performing position exchange on the selected sentences to implement scrambling processing.

18. The method for training the image-text mutual retrieval model according to claim 1, wherein before the in response to the training loss meeting the convergence condition, determining the initial model after the parameter adjustment as the image-text mutual retrieval model, the method comprises:

determining whether the training loss is less than a preset threshold, in response to the training loss being less than or equal to the preset threshold, determining that the training loss meets the convergence condition; and
in response to the training loss being greater than the preset threshold, determining that the training loss does not meet the convergence condition.

19. The image-text mutual retrieval model training method according to claim 2, the method, comprising:

using mean values of the features of the words output by all the BILSTM units in different BiLSTM networks within the first LSTM layer to represent the features of different target texts.

20. The image-text mutual retrieval method according to claim 13, the method, comprising:

calculating a vector distance between the target coding feature and all the data coding features, and determining the data coding feature with the smallest distance as the retrieval result.

* * * * *